United States Patent Office 2,718,487
Patented Sept. 20, 1955

2,718,487

HEMOSTATICS CONTAINING REACTION PRODUCTS OF THROMBIN AND ACRIDINES AND PROCESS OF PREPARING SAME

Rudolf Marx, Munich, Germany, assignor to Farbwerke Hoechst Aktiengesellschaft vormals Meister Lucius und Bruning, Frankfurt am Main, Germany, a company of Germany No Drawing. Application December 18, 1951, Serial No. 262,331

Claims priority, application Germany December 18, 1950

11 Claims. (Cl. 167—65)

The present invention relates to hemostatics containing thrombin and an acridine compound basically substituted in 9-position and a process of preparing them.

At present, highly active thrombin preparations are without doubt the best hemostatics for local administration. They have become indispensable for numerous therapeutical purposes. Since they are prepared from the blood of man and animals and only moderate yields are obtained, these thrombin preparations are expensive products. Moreover, the action of thrombin is impeded in certain cases by anti-thrombins, either therapeutically administered (heparin or the like) or contained in the blood (for instance, icterus-anti-thrombin).

Now, I have found that the action of thrombin preparations can be improved many times and their stability increased simultaneously, by reacting the preparations in aqueous solution with acridine compounds, basically substituted in 9-position, for instance, 2-ethoxy-6.9-diamino-acridine - lactate, 2 - ethoxy - 9 - [para - (gamma- diethylamino - beta - hydroxypropylamino) - phenylamino-acridine)]trihydrochloride, 3 - nitro - 9 (gamma - diethylamino - beta - hydroxypropylamino)-acridine-dihydrochloride, 2 - ethoxy - 9 - ethylamino - acridine-hydrochloride, 2 - ethoxy - 9 - aminoacridine - methochloride, 2 - ethoxy - 9 - (para - hydroxy - phenyl - ethyl-amino) - acridine - glycolate, 2 - ethoxy - 9 - (1' - phenyl-2'.3' - dimethylpyrazolonyl - (4')) - amino - acridine-hydrochloride.

Obviously, the basic acridine derivatives react with the acid groups of thrombin with formation of complex compounds of improved action and essentially smaller sensibility to the anti-thrombins above mentioned. These compounds are particularly useful where thrombin treatment is indicated.

Furthermore, it was found that the hemostatic effect of the thrombin preparations obtainable according to the present process can still be enhanced by the addition of known substances accelerating the action of thrombin, such as protamines, gelatin, starch, thrombocyte-extracts or synthetic polymers, such as, polyvinyl pyrrolidone, furthermore, pectin or pectin derivatives, alginates or their derivatives.

The following experiment shows, by way of example, the improved effect obtained by the reaction of thrombin with the above mentioned acridine derivatives.

*Experiment 1*

Different quantities of a thrombin preparation were used, on the one hand, without addition of an acridine compound and, on the other hand, after reaction with 2-ethoxy-6.9-diamino-acridine-lactate and the coagulation time was ascertained. At 37° C., 0.2 cc. of oxalated plasma from cattle, freed from prothrombin by adsorption with barium sulfate, was mixed with a mixture of the respective thrombin preparation, disolved in 0.2 cc. of water, and 0.1 cc. of water or 0.1 cc. of a 0.1% solution of 2-ethoxy-6.9-diamino-acridine-lactate, respectively, and the coagulation time was determined with the stop watch.

| Quantity of thrombin preparation in micrograms | Coagulation time in seconds | |
|---|---|---|
| | without the acridine compound | after reaction with the acridine compound |
| 800 | 4 | immediately. |
| 400 | 4 | Do. |
| 200 | 5.5 | Do. |
| 100 | 7.5 | 4.5. |
| 50 | 12 | 6. |
| 25 | 19.5 | 8.5. |
| 12.5 | 33 | 10. |

A similar abbreviation of the coagulation time is obtained by using instead of 2-ethoxy-6.9-diamino-acridine lactate, for instance, the folowing acridine derivatives: 2-ethoxy - 9 - [para - (gamma - diethylamino - beta - hydroxypropylamino)] - phenylamino - acridine - trihydrochloride, 3 - nitro - 9 - (gamma - diethylamino - beta-hydroxypropylamino) - acridine - dihydrochloride, 2-ethoxy - 9 - ethylamino - acridine - hydrochloride, 2-ethoxy - 9 - amino - acridine - methochloride, 2 - ethoxy-9 - (para - hydroxyphenyl - ethylamino) - acridine - glycolate, 2 - ethoxy - 9 - (1' - phenyl - 2'.3' - dimethylpyrazolonyl-(4'))-amino-acridine hydrochloride.

From the above data it will be easy for everybody skilled in the art to determine for each thrombin preparation used the optimum quantity of the various acridine derivatives mentioned. It goes without saying that the effect is not limited to this optimum ratio but that a good effect may also be obtained with higher or smaller proportions. In this sense, it is expressly stated that the quantitative ratios indicated in the examples are only illustrative without limiting the use to the indicated quantitative ratios.

By using untreated blood, similar results are obtained. It was found that the effect of thrombin can be increased about 4 to 5 times.

The preparations obtained by reaction of thrombin with acridine compounds are not only more potent but, as has already been stated, considerably less sensible to anti-thrombins.

The following experiment shows that the action of heparin is antagonized by thrombin - acridine - reaction products.

*Experiment 2*

According to the method indicated in Experiment 1, a thrombin preparation was caused to act on heparinized blood plasma, on the one hand, in the absence of an acridine compound and, on the other hand, after reaction with 2-ethoxy-6.9-diamino-acridine lactate, and the coagulation time was ascertained. At 37° C., 0.2 cc. of oxalated plasma from cattle, freed from prothrombin by adsorption with barium sulfate, and 0.1 cc. of a 0.0015% heparin solution (corresponding to 1.5 micrograms of heparin) was combined with 0.2 cc. of a mixture of 1 cc. of thrombin solution and 0.5 cc. of water or 0.5 cc. of an aqueous solution of 2-ethoxy-6.9-diamino-acridine-lactate (of 0.1 and 0.01%), respectively, and the coagulation time was measured with a stop watch.

| Coagulation time without acridine compound | Coagulation time after addition of a 0.1 % solution of acridine | Coagulation time after addition of a 0.01 % solution of acridine |
|---|---|---|
| 22 sec. | at once | 14.3 sec. |

The other acridine derivatives, used in Experiment 1, have the same effect.

As compared with pure thrombin solutions, the solutions obtained by reaction of thrombin preparations with acridine compounds have an improved stability. For therapeutical application, however, it is advisable, to convert the preparations in known manner, for instance, by freeze drying, into dry preparations from which fresh solutions will be prepared immediately before use by addition of the corresponding quantities of water. The dry preparations are practically stable for an unlimited space of time.

The following examples serve to illustrate the invention but they are not intended to limit it thereto:

*Example 1*

1 liter of a thrombin solution, obtained in known manner from oxalated plasma from cattle and containing 20 grams of dry substance is mixed with a solution of 0.4 gram of 2-ethoxy-6.9-diamino-acridine-lactate in 10 cc. of water, neutralized, centrifuged until clear, if desired, and freeze-dried in known manner. 20.4 grams of a voluminous dry powder are obtained, which dissolves in water to a clear solution and, filled into ampoules, is stable at room temperature for an unlimited space of time. By dissolving 0.1 gram of this product in 5 cc. of water, a solution is obtained which may be applied for therapeutical purposes and which is of utmost efficacy.

Instead of 2-ethoxy-6.9-diamino-acridine-lactate the same quantities of the preparations 2-ethoxy-9-[para-(gamma - diethylamino - beta - hydroxypropylamino)]-phenylamino - acridine - trihydrochloride or 3 - nitro - 9 - (gamma - diethylamino - beta - hydroxypropylamino)-acridine-dihydrochloride may be used.

*Example 2*

1 liter of the thrombin solution used in Example 1 is mixed with a solution of 0.2 gram of 2-ethoxy-9-ethyl-amino-acridine-hydrochloride in 10 cc. of water and the whole is worked up as described in Example 1.

Instead of the compound mentioned, 2-ethoxy-9-amino-acridine-methochloride may also be used.

*Example 3*

1 liter of the thrombin solution used above is mixed with a solution of 0.1 gram of 2-ethoxy-9-(para-hydroxy-phenyl - ethylamino) acridine - glycolate or 2 - ethoxy- 9 - (1' - phenyl - 2'.3' - dimethylpyrazolonyl - (4'))-amino-acridine hydrochloride in 10 cc. of water and the whole is worked up to form a dry preparation as indicated in Example 1. A stable dry preparation is obtained of which 0.1 gram, dissolved in 5 cc. of water, has an excellent hemostatic effect.

*Example 4*

Before freeze-drying a thrombin batch worked up as described in Example 1, 20 grams of starch are mixed therewith to form a homogeneous mass. The resultant dry preparation, applied in the dry state on bleeding surfaces, has a particularly good hemostatic effect.

*Example 5*

200 cc. of a 10% neutralized pectin solution are added to a thrombin batch worked up as described in Example 2. After freeze-drying as above described, a thrombin preparation of excellent hemostatic action is obtained.

*Example 6*

100 cc. of a 10% polyvinylpyrrolidone solution are added to a batch prepared according to Example 3 and the whole is worked up as usual.

*Example 7*

200 mg. of the final product obtained according to Example 1, paragraph 1, are dissolved in 5 cc. of a 3% gelatin solution. A thrombin preparation is obtained which, when sprayed on wounds, has a particularly good hemostatic effect.

*Example 8*

1 liter of the thrombin solution used in Example 1, paragraph 1, is concentrated in vacuo at an internal temperature of 5° C.–10° C. to half its weight. 500 cc. of a 6% gelatin solution and a solution of 0.4 gram of 2-ethoxy - 9 - ethylamino - acridine - hydrocloride in 20 cc. of water are added and the whole freeze-dried in the usual manner.

About 50 grams of a voluminous dry powder are obtained which, when strewn on wounds, has an excellent hemostatic effect.

I claim:

1. Hemostatics containing reaction product of thrombin and an acridine compound basically substituted in 9-position.

2. Hemostatics containing reaction product of thrombin and an acridine compound basically substituted in 9-position with the addition of known accelerators for thrombin-action.

3. A hemostatic containing reaction product of thrombin and 2-ethoxy-6.9-diamino-acridine-lactate.

4. A hemostatic containing reaction product of thrombin and 2-ethoxy-6.9-diamino-acridine-lactate and also containing gelatin as an accelerator for thrombin-action, in freeze-dried form.

5. A hemostatic containing a reaction product of thrombin and 2-ethoxy-9-ethylamino-acridine-hydrochloride.

6. A hemostatic containing a reaction product of thrombin and 2 - ethoxy - 9 - (para - hydroxy - phenyl- ethylamino) acridine-glycolate.

7. A hemostatic containing a reaction product of thrombin and 2 - ethoxy - 9 - [para - (gamma - diethylamino - beta - hydroxypropylamino)] - phenylamino-acridine - trihydrochloride.

8. A hemostatic containing a reaction product of thrombin and 3 - nitro - 9 - (gamma - diethylamino - beta-hydroxy - propylamino) - acridine - dihydrochloride.

9. A process of preparing thrombin preparations by reacting thrombin in aqueous solution with an acridine compound basically substituted in 9-position.

10. A process as claimed in claim 9 by converting the solution obtained into dry-preparations by means of freeze-drying.

11. A process as claimed in claim 9 by using an aqueous thrombin solution of plasma from cattle, adding 2-ethoxy-6.9-diamino-acridine-lactate in aqueous solution, and freeze-drying the solution obtained.

References Cited in the file of this patent

UNITED STATES PATENTS

| | | |
|---|---|---|
| 2,040,973 | Benda | May 19, 1936 |
| 2,077,249 | Mietzsch | Apr. 13, 1937 |
| 2,083,908 | Hata | June 15, 1937 |
| 2,092,114 | Goissedet | Sept. 7, 1937 |
| 2,092,131 | Mietzsch | Sept. 7, 1937 |
| 2,121,207 | Mietzsch | June 21, 1938 |
| 2,492,458 | Bering | Dec. 27, 1949 |
| 2,558,395 | Studer | June 26, 1951 |

OTHER REFERENCES

Olwin et al., Surgery, Gyn. & Obstet., Feb. 1948, pp. 203–211.